United States Patent [19]
Robbins et al.

[11] Patent Number: 5,182,948
[45] Date of Patent: Feb. 2, 1993

[54] ADJUSTABLE MEASURING CONTAINER

[75] Inventors: E. Stanley Robbins, Killen; Rodney W. Robbins, Florence, both of Ala.; Darrel J. Watt, Marietta; Wendell G. Wilson, Atlanta, both of Ga.

[73] Assignee: Robbins Industries, Inc., Florence, Ala.

[21] Appl. No.: 740,153

[22] Filed: Aug. 5, 1991

[51] Int. Cl.⁵ .............................................. G01F 19/00
[52] U.S. Cl. ........................................ 73/429; 33/426
[58] Field of Search .................. 73/429, 426, 427, 428; D10/46.2

[56] References Cited

U.S. PATENT DOCUMENTS

| | | | |
|---|---|---|---|
| D. 328,867 | 8/1992 | Watt et al. | D10/46.2 |
| 2,389,530 | 11/1945 | Miner | 73/429 |
| 2,396,943 | 3/1946 | Frank | 73/429 |
| 2,496,268 | 2/1950 | Chester | 73/429 |
| 2,555,956 | 6/1951 | Chester | 73/429 |
| 2,569,703 | 10/1951 | Weiland | 73/429 |
| 2,626,526 | 1/1953 | Chester | 73/429 |
| 2,854,849 | 10/1958 | Setecka | 73/429 |
| 3,690,182 | 9/1972 | Rodriguez | 73/429 |
| 3,798,975 | 3/1974 | Horst | 73/429 |

FOREIGN PATENT DOCUMENTS 649068  1/1951  United Kingdom ................... 73/429

*Primary Examiner*—Thomas B. Will
*Attorney, Agent, or Firm*—Gregor N. Neff

[57] ABSTRACT

The measuring container has a body with a bowl at one end. A sliding cover is provided with a sliding barrier member or dam which moves longitudinally in the bowl to different positions to adjust the capacity of the bowl. The sliding dam or barrier member has a cover which extends by a distance sufficient to cover the opening between the dam and the rear wall of the bowl at all positions of the barrier member so as to prevent materials from entering that opening.

12 Claims, 2 Drawing Sheets

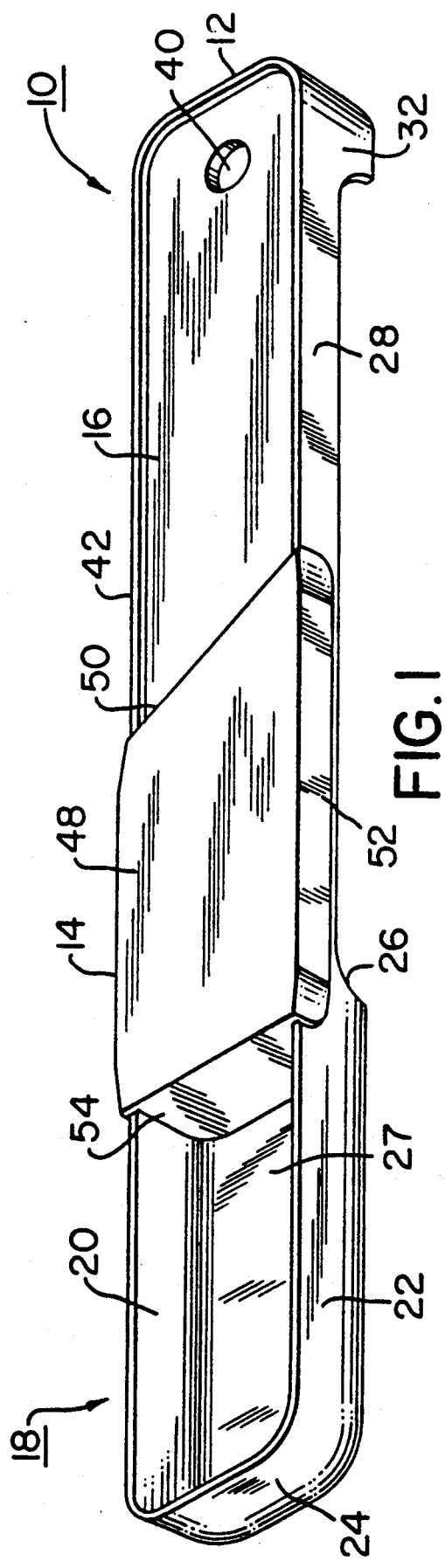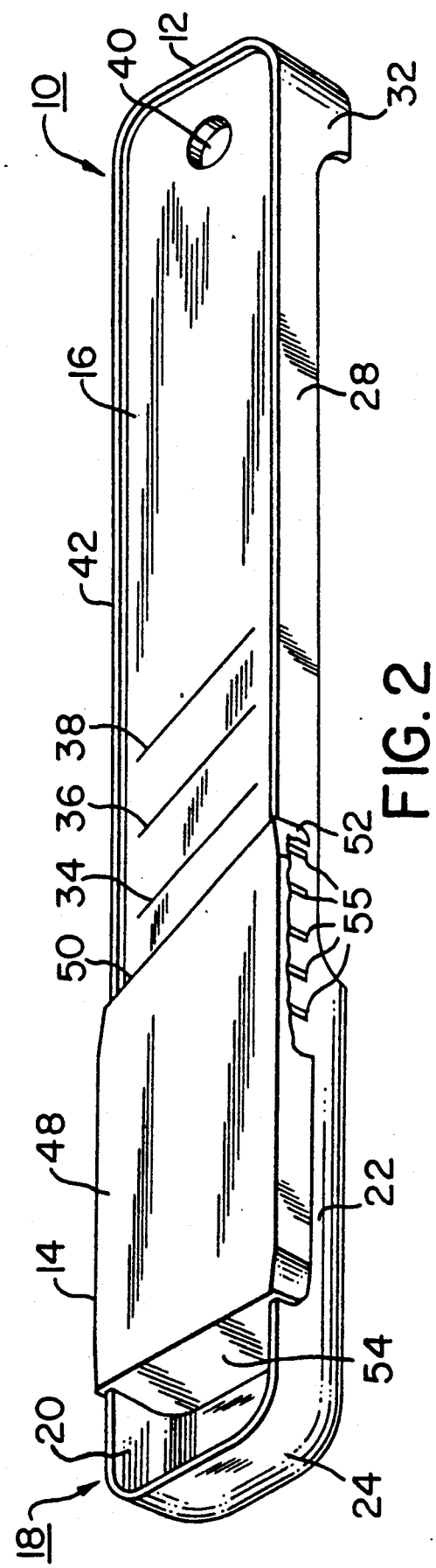

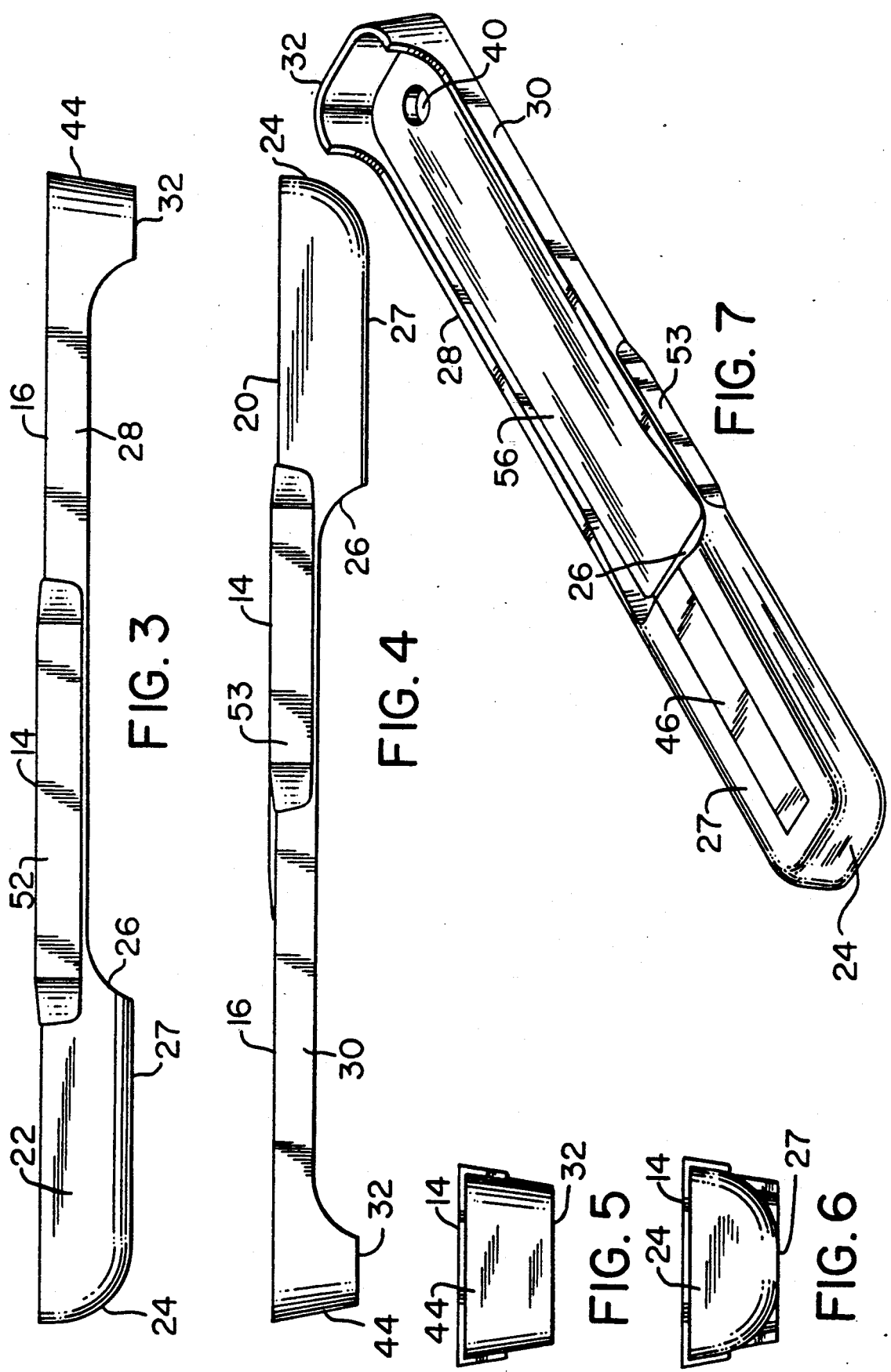

ADJUSTABLE MEASURING CONTAINER

This invention relates to measuring containers, and particularly to adjustable measuring spoons, cups and scoops. Priority for this Patent Application is claimed from U.S. patent application Ser. No. 07/492,565, filed Mar. 13, 1990.

It usually is cumbersome and time-consuming for a cook to find the right one of a set of different measuring spoons to measure condiments such as spices, sugar, salt and other food substances. The same is true for other measuring containers such as measuring cups and scoops. To alleviate this problem in the past, adjustable measuring containers have been proposed in which the capacity of the container can be adjusted so that it is not necessary to hunt for a separate spoon of the correct capacity.

One type of prior adjustable measuring spoon is shown in U.S. Pat. Nos. 2,389,530 to Miner and 2,569,703 to Weiland. In such a spoon, a bowl is provided with a plurality of different compartments, each formed by a separate vertical wall, with a sliding cover to cover one or more of the compartments and leave the others open. Each compartment is of a different size selected to hold the measured amount of material.

This type of spoon has not proved to be satisfactory. The fixed compartments are relatively small and difficult to clean out. Furthermore, it often is difficult to fill each of several compartments because the material does not easily flow over one wall into the next compartment. Furthermore, the spoon is more complicated and expensive to make than is desired. Also, the spoon does not permit the capacity to be varied in measured amounts other than the specific increments provided by the compartments. In other words, an infinitely-variable measuring capacity is not provided.

A second type of adjustable spoon which has been proposed is shown in U.S. Pat. Nos. 2,165,642 to Mayer, and 2,697,353 and 2,854,849 to Setecka. In such a prior spoon, a slidable barrier or dam is provided. Movement of the barrier in the bowl of the spoon changes its capacity. Although this eliminates some of the problems caused by the fixed compartments of the other prior art spoons mentioned above, it creates the problem that the space between the sliding barrier and the rear wall of the spoon bowl is left open when the barrier is moved toward the forward end of the spoon bowl. This allows granular particles or liquids being measured to enter that space and impair the accuracy of the measurements. This also may make the spoon difficult to clean because of the materials lodged in the space. In addition, the adjustable spoons shown in these patents also are relatively complex and expensive to manufacture.

Accordingly, it is an object of the present invention to provide an adjustable measuring container which solves or substantially alleviates the above-identified problems.

In particular, it is an object of the present invention to provide an adjustable measuring container which does not have excessively small compartments to clean, and which provides a wide degree of variability in the capacity of the container. Furthermore, it is desired to provide such a container in which there are no unwanted open cavities to fill by accident.

It is a further object of the invention to provide such a container which is relatively easy to fill, both when dipping the spoon into a quantity of substance to be measured, and when pouring a substance into the container.

It also is an object of the invention to provide such a container which is relatively simple in construction and inexpensive to manufacture; one which is relatively easy to use and clean, and is rugged and durable.

In accordance with the present invention, the foregoing objects are satisfied by the provision of an adjustable measuring container which has a body member With a bowl at one end. A barrier structure with a barrier member forming a dam in the bowl and a cover are slidable attached to the body member. The cover is dimensioned so that it covers the space between the dam and the rear wall of the bowl at all points to which the barrier member can be moved in the bowl, thus preventing the unwanted accumulation of materials in that space.

Preferably, the container is a measuring spoon. The body of the spoon has a substantially straight portion and the cover has slide gripping means which slides along the straight portion for adjustment purposes. The slide gripping means preferably comprise flanges extending downwardly from the edges of the cover to slidably engage the sides of the body.

Preferably, markings are provided on the body to indicate the capacity of the spoon, and the rear edge of the cover can be aligned with the markings to indicate the capacity of the spoon corresponding to the position of the barrier member.

It is preferable that the bottom of the spoon be flattened at each end so that the spoon will sit on a flat surface and remain stable and level while substances are being poured into the bowl of the spoon for measurement.

It also is preferable that the portion of the body extending from the bowl be a flat surface with depending flanges, thereby making the body of the spoon relatively simple and easy to fabricate by molding.

The foregoing and other objects and advantages will be set forth in or apparent from the following description and drawings.

In the drawings:

FIG. 1 is an isometric view of an adjustable measuring spoon constructed in accordance with the present invention showing the sliding dam or barrier and the cover in one extreme position;

FIG. 2 is an isometric view, partially cut-away, of the adjustable spoon showing the sliding dam or barrier and the cover in an extreme position opposite to that shown in FIG. 1;

FIG. 3 is a side elevation view of the spoon shown in FIGS. 1 and 2;

FIG. 4 is a side elevation view of the spoon shown in FIGS. 1 through 3, taken from the side opposite the one shown in FIG. 3;

FIG. 5 is an elevation view of the spoon shown in FIGS. 1 through 4 taken from the end of the handle;

FIG. 6 is an elevation view of the spoon shown in FIGS. 1 through 5 taken from the spoon end; and FIG. 7 is an isometric bottom view of the spoon shown in FIGS. 1 through 6.

Referring first to FIG. 1, the adjustable spoon 10 includes a body member 12 and a slider member 14 which slides on the body member 12.

The body member comprises a single molding having a flat upper surface 16 and an elongated bowl 18 at one end. The bowl 18 has side walls 20 and 22, a forward end wall 24, and a rear end wall 26, and a bottom wall 27 which is flat in the middle, as is indicated at 46 in FIG. 7. The bowl has rounded corners. The sides are inclined slightly with respect to vertical, as shown in FIGS. 5 and 6. This helps to hold the slider on to the body member 12.

Extending downwardly from the edges of the flat upper surface 16 of the body member 12 are flanges 28 and 30 (see FIGS. 4 and 7 which show the flange 30). The flanges 28 and 30 extend downwardly by a distance less than the height of the bowl 18.

At the end of the spoon opposite the bowl, flanges 30 and 28 merge with a flange 32 which extends downwardly by a distance equal to the height of the bowl.

As it is shown in FIG. 7, this construction results in the formation of a cavity 56 underneath the upper surface 16 of the spoon. The flanges 28 and 30 provide structural rigidity to make the spoon rugged and durable, and yet permit the molding of the spoon with relatively uniform thickness of material to facilitate the molding process and minimize its manufacturing cost.

Referring again to FIGS. 1 and 2, the slider 14 includes a flat cover 48 and a barrier or dam member 54 which extends downwardly perpendicularly from the left edge of the cover 48 into the bowl 18. The shape of barrier member 54 is contoured to that of the bowl so that it will form a compartment into which substances to be measured can be placed. The compartment holds solid materials easily. Also, by pressing down on the cover 48 near the barrier member 54, a relatively tight seal can be formed so that liquids can be measured in the adjustable compartment of the bowl.

The sliding structure 14 includes a pair of flanges 52 and 53 (see FIGS. 3 and 4) which extend downwardly at a slight angle from vertical and parallel to the side walls of the body 12. Flanges 52 and 53 lightly grip the side flanges 28 and 30 of the body member, and the side walls 20 and 22 of the bowl.

A slightly raised edge 42 is provided around the flat surface 16 to form bearing surfaces on which the slider 14 can slide easily.

Referring again to FIGS. 1 and 2, the rear edge 50 of the slider 14 forms an acute angle with the longitudinal axis of the spoon.

As it is shown in FIG. 2, the upper surface 16 of the body member is marked with a plurality of lines 34, 36 and 38 which are used as measuring indicia. Each of the lines 34, 36 and 38 forms the same acute angle with the longitudal axis of the spoon as does the edge 50 of the slider 14. Indicia 34, 36 and 38 are positioned so that the edge 50 is aligned with one of them, the compartment formed in the spoon between the barrier 54 and the other walls of the spoon has the capacity marked next to the line 34, 36 or 38 with which the edge 50 is aligned. For example, the lines might be marked "1 teaspoon", "1½ teaspoon", etc.

A detent structure is provided to stop the slider 14 accurately with the edge 50 aligned with one of the indicia 34, 36 and 38, etc. so as to easily set the capacity of the spoon at a desired value. Referring to FIG. 2, the flange 52 is shown partly cut away to show a plurality of grooves 55 in the body. A projection on the inside surface of the flange 52 mates with each of the grooves to perform the detent function.

The user can vary the capacity of the spoon infinitely by stopping the slide 14 at any of a number of points between detent positions.

The spoon described above and shown in the drawings is highly advantageous and satisfies the objectives set forth above. The spoon has no tiny compartments which make prior art devices so hard to fill, hard to keep clean, and relatively expensive to fabricate. Furthermore, the capacity of the spoon is variable in infinitely small increments, as desired by the user.

The spoon has a cover which covers the unused portion of a spoon bowl so as to prevent materials being measured from entering that portion and causing inaccuracy in the measurement, and difficulty in cleaning.

The sliding cover can be easily snapped on and snapped off due to the flexibility of the plastic material of which it is made so that it can be easily washed.

The bottom of the spoon is structured so as to hold the spoon flat and level when resting upon a flat surface so as to promote accurate measurements when pouring materials into the cavity of the spoon, and to enable the spoon to be laid aside for a time without spilling its contents.

The formation of the body member having a flat upper surface with downwardly extending flanges facilitates the molding and helps minimize manufacturing costs of the body member. Similarly, the slider is easy to make by molding. The spoon is thus relatively simple in construction, low in cost, rugged and durable, and highly functional.

It should be understood that the invention is applicable to measuring containers other than spoons. For example, the invention can provide a variable capacity measuring cup or scoop, with benefits similar to those available when the invention is used in an adjustable measuring spoon.

This invention can be practiced in many different forms other than the specific forms described above. Those specific forms are described in order to set forth the best mode presently contemplated for carrying out the invention. However, the protection of this patent shall not be limited to those forms and should be interpreted to cover other measuring containers utilizing the spirit and contribution of the invention.

We claim:

1. A measuring container device, said device comprising, in combination, a body member having side walls, a bowl adjacent one end, said bowl having a forward end wall and a rear end wall, a sliding dam structure slidably mounted on said body member, said dam structure comprising a dam element extending into said bowl and being shaped to fit the contours of said bowl and form a dam to limit the effective volume of said bowl at each of a plurality of different locations in said bowl, and a cover member extending from said dam member by a distance sufficient to cover the rear portion of said bowl when said dam member is moved away from said rear end wall, said cover member having edges shaped to engage said side walls of said body member to hold said cover on and allow it to slide thereon, said cover member being flexible to enable it to be easily snapped off of said body member.

2. A device as in claim 1 in which said side walls are inwardly angled and said cover member has a planar portion and inwardly angled flanges extending downwardly from the edges of said planar portion to embrace said side walls of said body member.

3. A device as in claim 1 in which said cover member partially covers said body member and has a rear edge, said body member bears markings indicating the capacity of the spoon at various longitudinal positions, and said rear edge is located to be aligned with each of said markings when said dam member is in a position giving said spoon a capacity equal to the marking with which said rear edge is aligned.

4. A device as in claim 3 in which said rear edge of said cover forms an acute angle with the longitudinal axis of said body member, said markings being linear indicia extending at said acute angle with respect to said longitudinal axis.

5. A device as in claim 1 in which said body member has a planar upper surface with flanges extending downwardly from the edges of said upper surface.

6. A device as in claim 5 in which said flanges extend downwardly by a distance substantially less than the height of said bowl, said body portion having one end opposite said bowl with an end flange portion which extends downwardly by a distance substantially equal to the height of said bowl.

7. A device as in claim 3 including detent means comprising a projection from a surface of said flexible cover member and a series of spaced grooves in said body member, in a position to engage said projection when said cover slides on said body member, for releasably holding said cover member at each of a plurality of longitudinal positions.

8. A device as in claim 6 in which the bottom of said bowl is substantially flat with rounded corners, and in which the bottom edge of said end flange portion forms a support substantially parallel to said bottom of said bowl.

9. An adjustable measuring spoon, said spoon comprising, in combination, an elongated molded body member having a flat upper surface, an elongated bowl with side walls, a front wall, rear wall and a bottom wall, said walls forming a bowl open at the top, the upper edges of said side and front walls being substantially co-planar with said upper surface, a separable, slidably adjustable, generally L-shaped barrier structure, said barrier structure having a barrier element extending downwardly into said bowl and shaped to match the contours of the interior of said bowl, a flat upper panel joined to said barrier element at one end, said upper panel extending longitudinally on said body member by a distance sufficient to cover the portion of said bowl which is located between said barrier element and said rear wall of said bowl when said barrier element is in any of its positions to which it can be moved in said bowl, said barrier structure also having depending flanges on its sides to slidably grip said body member, said barrier structure being flexible to enable it to be easily snapped off of said body member.

10. A spoon as in claim 9 in which said flat upper surface of said body member has a slightly raised outer edge to serve as a bearing surface upon which said barrier structure can slide.

11. A spoon as in claim 9 in which the bottom of said body member forms a support to support said spoon horizontally on a flat support surface with said flat upper surface of said body member substantially parallel to said flat support surface.

12. A spoon as in claim 10 in which said body member has side flanges extending down from the edges of said flat upper surface, and an end flange extending downwardly by a distance approximately equal to the depth of said bowl.

* * * * *